US012431632B2

(12) United States Patent
Ho et al.

(10) Patent No.: US 12,431,632 B2
(45) Date of Patent: Sep. 30, 2025

(54) SYSTEMS AND METHODS FOR INTEGRATING ANTENNAS INTO TEXTILE BANDS

(71) Applicant: Meta Platforms Technologies, LLC, Menlo Park, CA (US)

(72) Inventors: John Ho, Sunnyvale, CA (US); Wenjing Su, Mountain View, CA (US); Jiang Zhu, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 242 days.

(21) Appl. No.: 18/177,788

(22) Filed: Mar. 3, 2023

(65) Prior Publication Data

US 2024/0297443 A1 Sep. 5, 2024

(51) Int. Cl.

| | |
|---|---|
| ***H01Q 17/00*** | (2006.01) |
| ***H01Q 9/04*** | (2006.01) |
| ***H01Q 9/30*** | (2006.01) |

(52) U.S. Cl.

CPC ......... *H01Q 17/002* (2013.01); *H01Q 9/0407* (2013.01); *H01Q 9/30* (2013.01)

(58) Field of Classification Search

CPC .... H01Q 1/273; H01Q 17/002; H01Q 9/0407; H01Q 9/30

See application file for complete search history.

(56) References Cited

U.S. PATENT DOCUMENTS

| | | | | |
|---|---|---|---|---|
| 11,185,449 | B2 * | 11/2021 | Sarma | G06K 19/07773 |
| 2008/0309088 | A1 * | 12/2008 | Agamloh | H02K 7/1876 290/53 |
| 2009/0251258 | A1 * | 10/2009 | Rhinefrank | H02K 15/03 290/53 |
| 2011/0015498 | A1 * | 1/2011 | Mestrovic | A61B 5/01 600/592 |
| 2019/0242036 | A1 * | 8/2019 | Bogan | D03D 1/0088 |
| 2020/0029863 | A1 * | 1/2020 | Kiourti | A61B 5/4528 |
| 2021/0209912 | A1 * | 7/2021 | Claeys | G08B 13/2442 |
| 2022/0134814 | A1 * | 5/2022 | Iozia | B60C 11/246 73/146.5 |
| 2022/0230042 | A1 * | 7/2022 | Forster | G06K 19/07775 |
| 2024/0031785 | A1 * | 1/2024 | Lynch | H04L 67/5683 |

* cited by examiner

*Primary Examiner* — Thien M Le

(74) *Attorney, Agent, or Firm* — Foley & Lardner LLP

(57) ABSTRACT

A wearable device including a physical processor and a textile band that is dimensioned to secure the wearable device to a user and that comprises an antenna. The wearable device also includes a coupler that communicatively couples the antenna to the physical processor. Various other devices, systems, and methods are also disclosed.

20 Claims, 13 Drawing Sheets

SYSTEMS AND METHODS FOR INTEGRATING ANTENNAS INTO TEXTILE BANDS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1A:
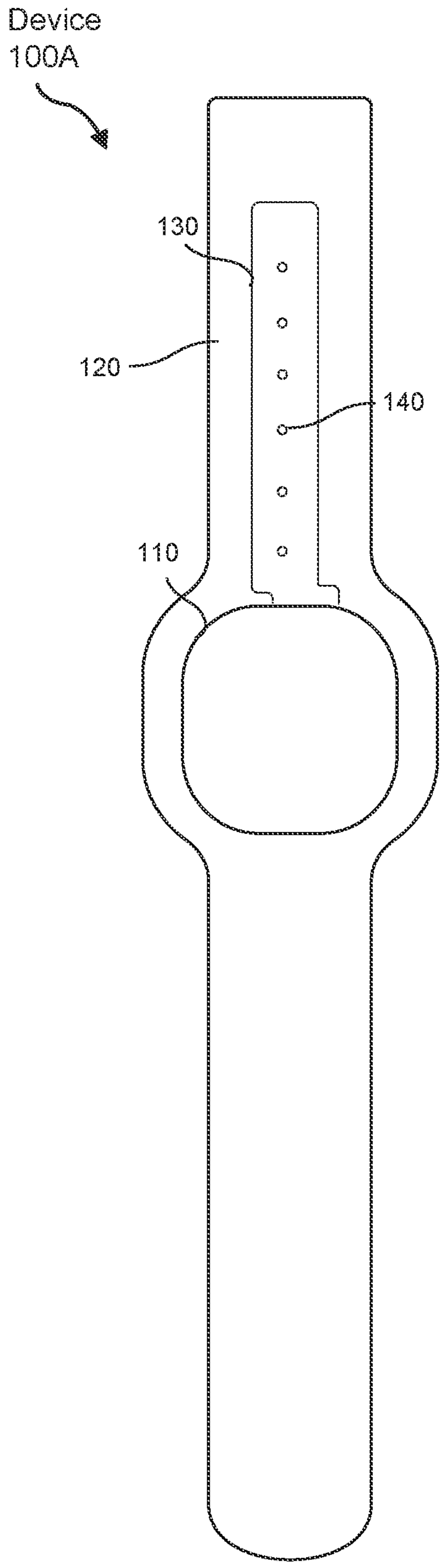
FIGS. 1A and 1B are illustrations of exemplary wearable devices having antennas within textile bands.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to the manufacture, design, assembly, and implementation of antennas for wearable electronic devices. Wearable electronic devices typically have a very limited amount of space for electrical and mechanical components. Often, these components may be positioned in non-optimal locations, including locations that are prone to "desense" or to a loss in signal quality. For example, wrist-worn electronic devices typically include antennas within bodies of the devices, and due to size constraints, may be relatively small and susceptible to interference from other components.

Straps of wrist-worn devices and other wearable devices may provide relatively large surface areas for integrating antennas. Unfortunately, such straps typically need to be bendable or elastic to accommodate different users' bodies, to provide comfort, and to enable the straps to deform as a user moves. Traditional antennas, which are made of solid metals, are less than ideal for use in such straps as they are susceptible to failure as a band bends and stretches.

The present disclosure provides systems and methods for manufacturing, assembling, and using textile antennas in straps of wearable devices. Antennas that are integrated into textile straps may be flexible, breathable, bendable, stretchable, and/or resilient and may therefore overcome many of the disadvantages of more traditional approaches. Textile antennas may be made from woven metallic threads, non-metallic threads coated with conductive materials, and/or threads with liquid metal cores. Such antennas and transmission lines may be connected to other electronic components via either non-contact coupling (e.g., capacitive coupling) or by direct contact.

Figure 1B:
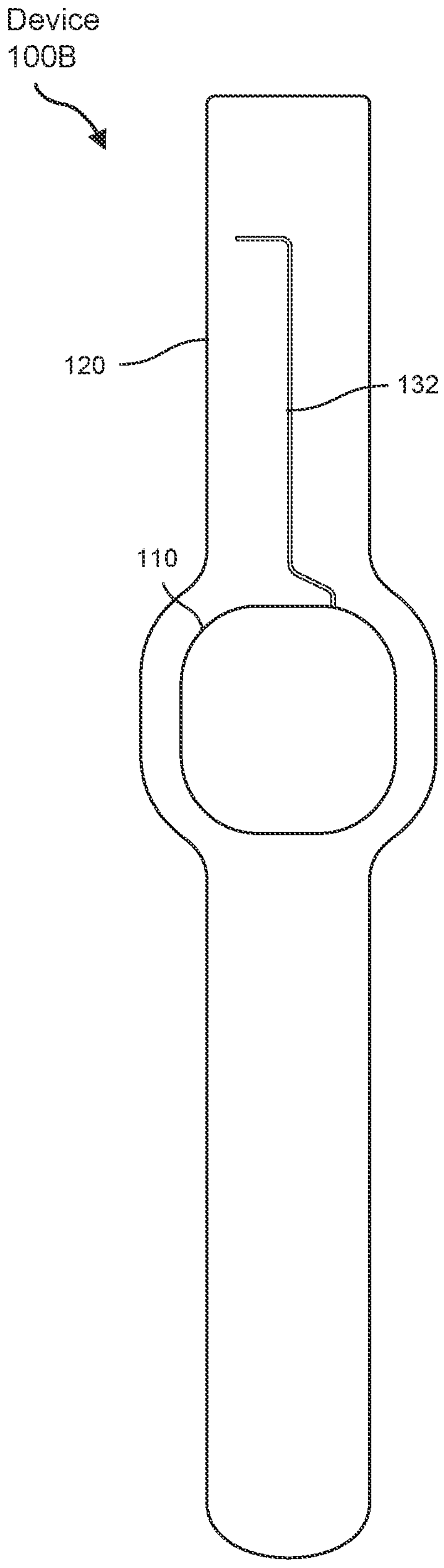
Figure 2A:
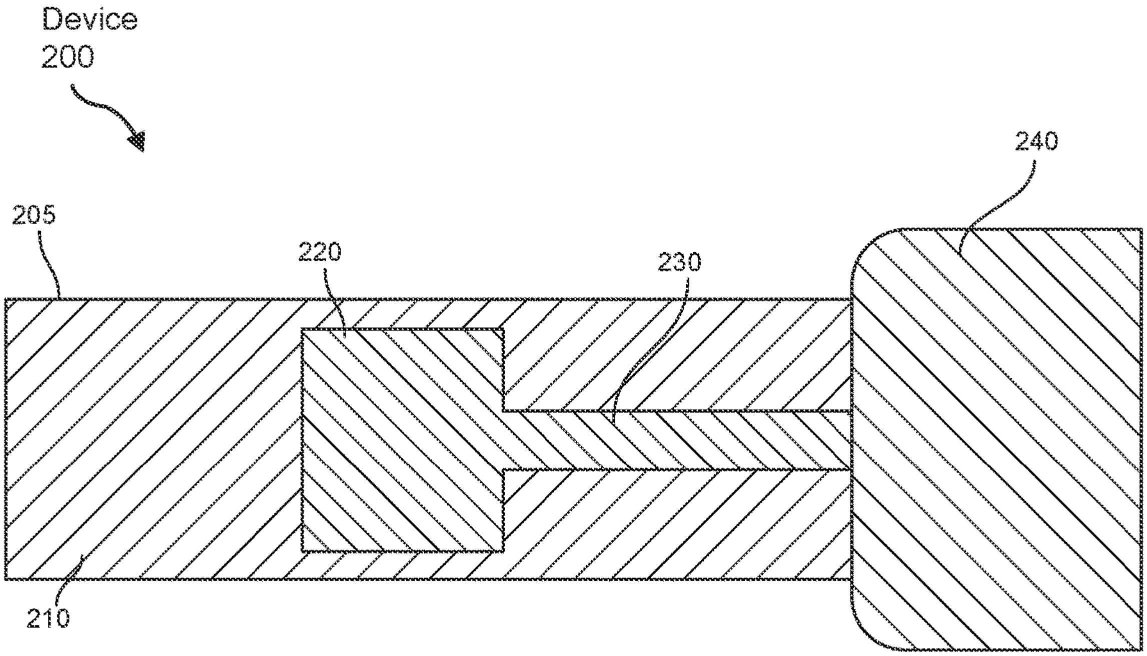
FIG. 2A is an illustration of a patch antenna within a textile band.
Figure 2B:
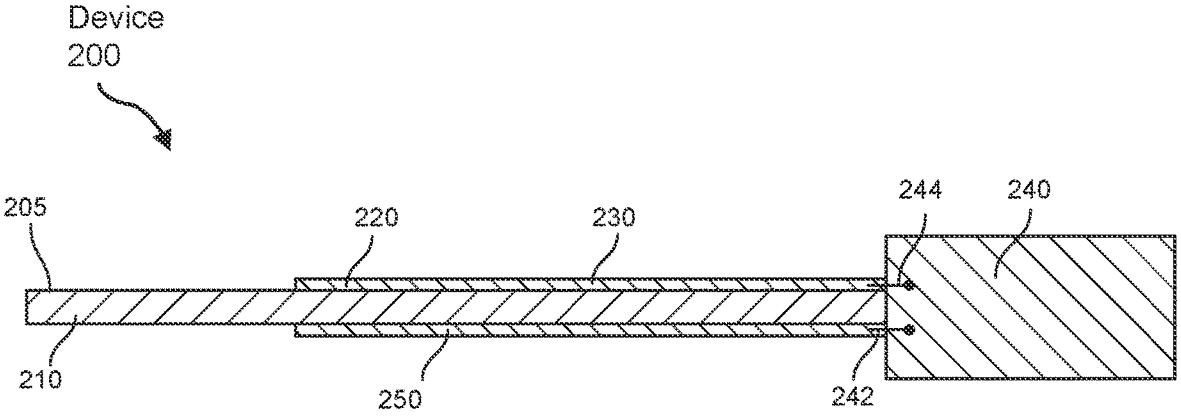
FIG. 2B is a cross-sectional side view of the patch antenna illustrated in FIG. 2A.
Figure 3A:
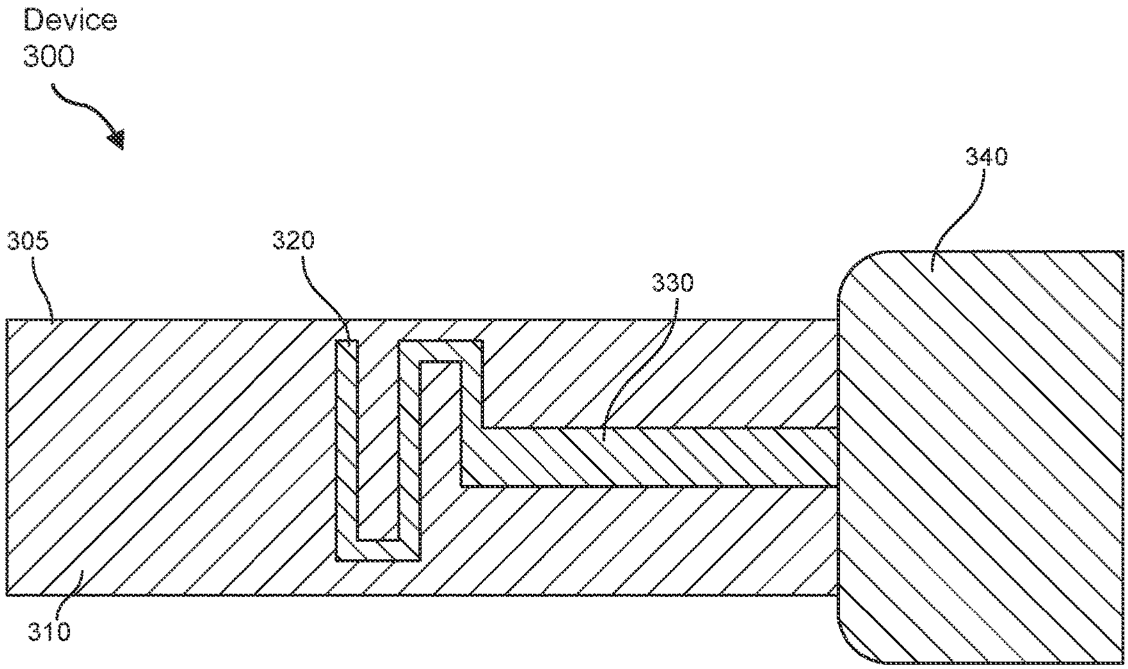
FIG. 3A is an illustration of a monopole antenna within a textile band.
Figure 3B:
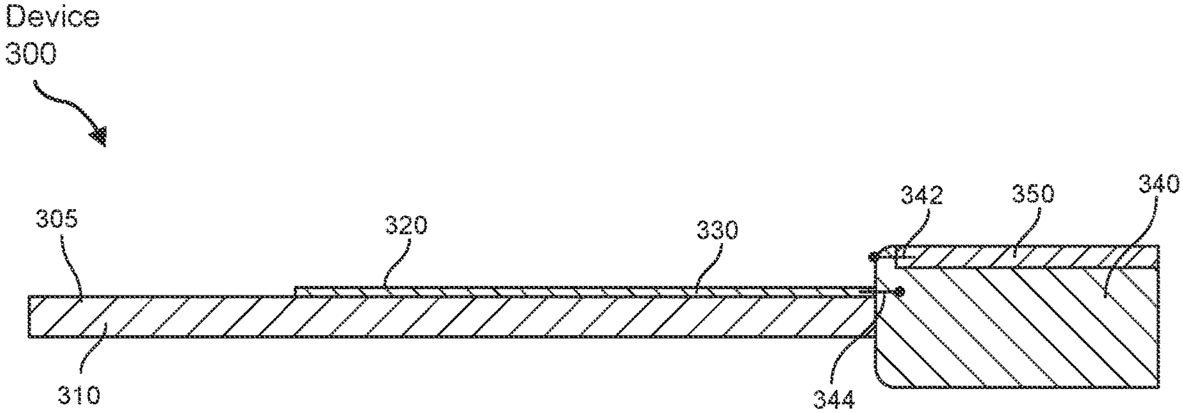
FIG. 3B is a cross-sectional side view of the monopole antenna illustrated in FIG. 3A.
Figure 5:
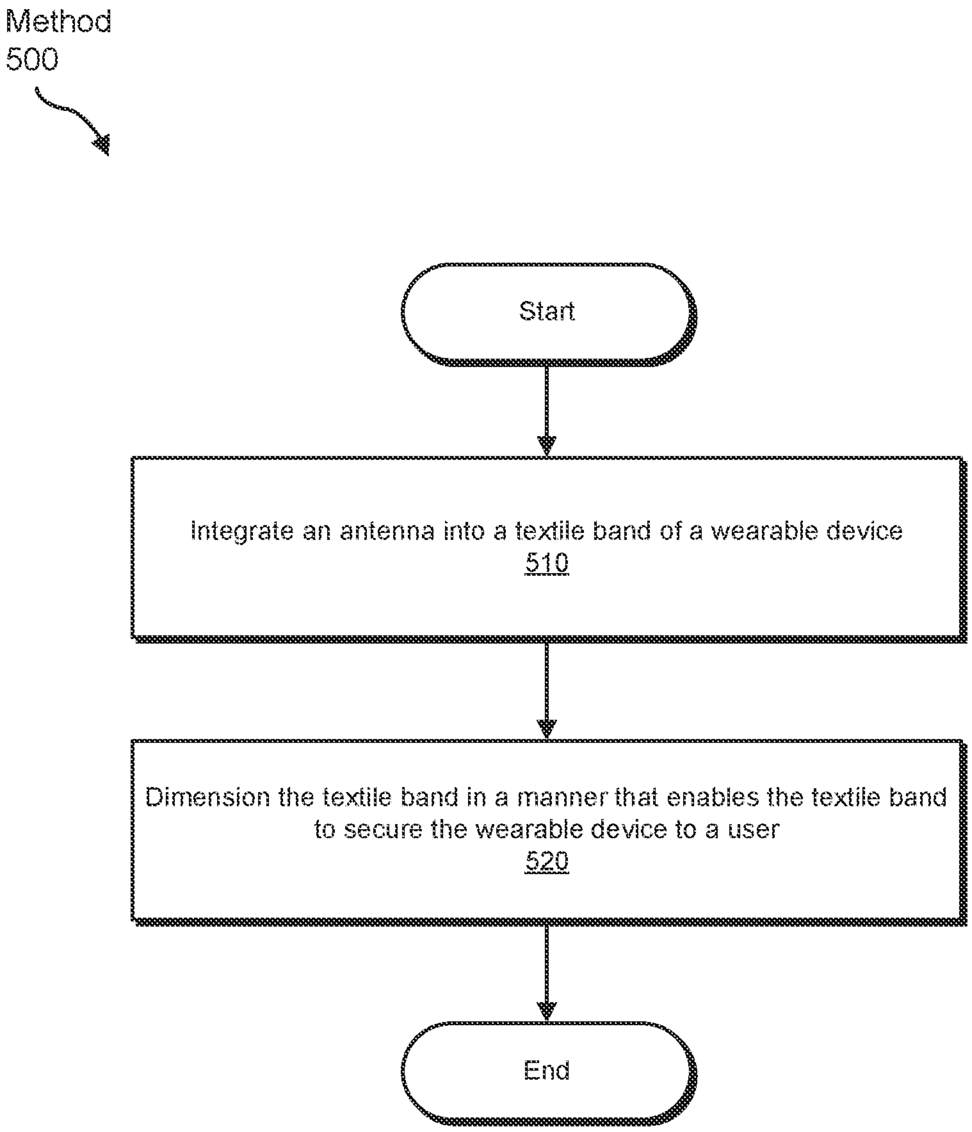
FIG. 5. is a flow diagram of an exemplary method for manufacturing a textile band with an integrated antenna.
Figure 6:
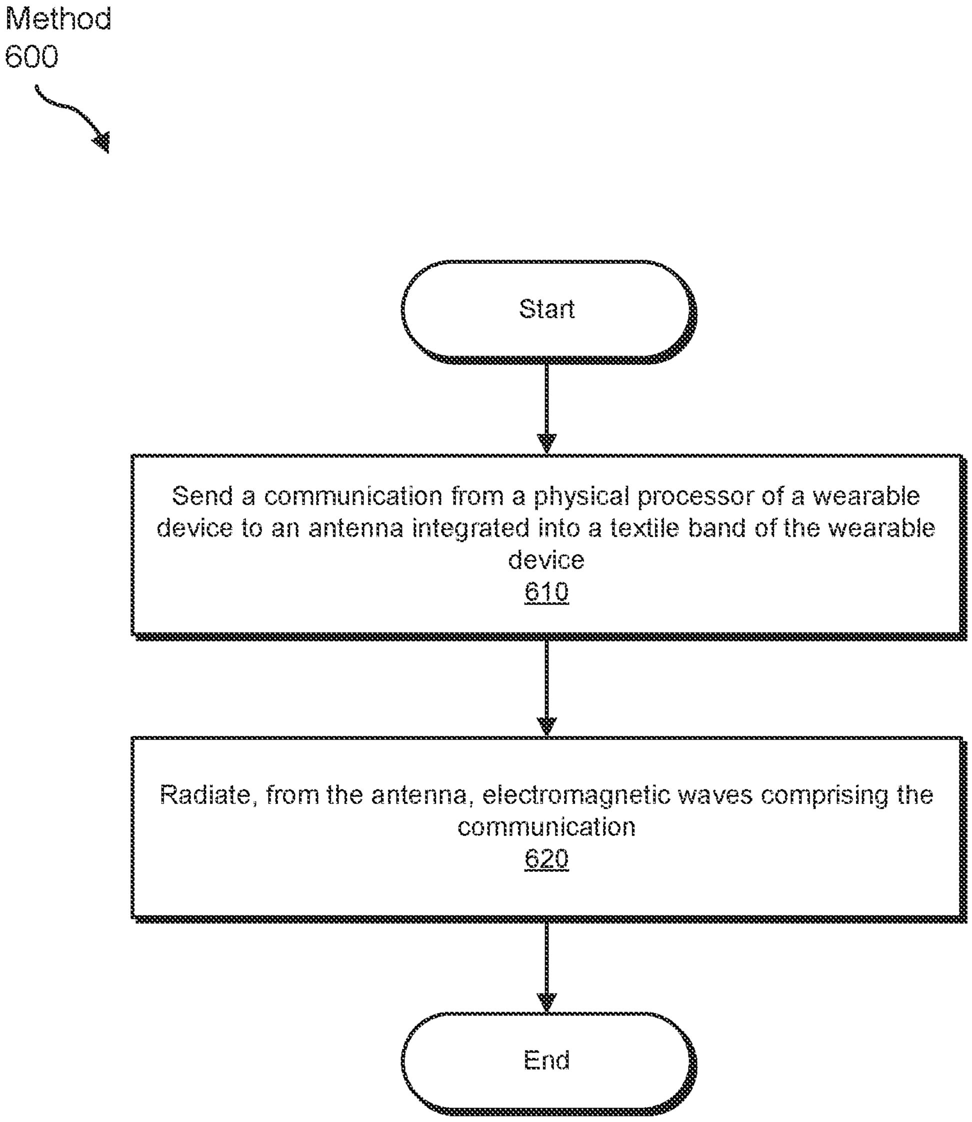
FIG. 6. is a flow diagram of an exemplary method for communicating thorough an antenna integrated into a textile band.

The following disclosure provides various examples of integrating textile antennas within wearable straps. For example, the discussion corresponding to FIGS. 1A and 1B provides examples of how textile antennas may be integrated into watches, other wrist-worn devices, and any other device strap (e.g., a virtual reality headset strap, an augmented-reality headset strap, etc.). The discussion corresponding to FIGS. 2A and 2B provides an example of a patch antenna integrated into a textile strap, and the discussion corresponding to FIGS. 3A and 3B provides an example of a monopole antenna integrated into a textile strap. The discussion corresponding to FIG. 4A covers examples of using contact pins for coupling textile antennas in wearable straps to other electronics, and the discussion corresponding to FIG. 4B covers examples of using capacitive coupling. The discussion corresponding to FIGS. 5 and 6 provides examples of methods of forming and using textile antennas. Finally, the discussion corresponding to FIGS. 7-13 provides examples of artificial reality systems in which the textile antennas discussed herein may be implemented.

Turning to FIGS. 1A and 1B, device 100A and device 100B may include a wearable system 100 having a body 110, a band 120, and a textile antenna 130 and 132, respectively, embedded within band 120. Body 110 may be a watch body, a body of a health device, a companion device for an artificial reality headset, or any other type or form of computing device. In some examples, body 110 may include a processor or other electronic components for sending and receiving signals via antennas 130 and 132. Body 110 may be various sizes or shapes, and in some examples, may be configured to be held or secured to a user's body via band 120.

Band 120 may be any type or form of band for securing electronic devices to users. The term band, in some embodiments, may generally refer to any type or form of band, strap, belt, harness, leash, or other mechanism for securing or fastening an electronic device to a user. Band 120 may be partially or completely made from textile materials.

Band 120 may include an integrated antenna 130. The term antenna, in some examples, may generally refer to any type or form of interface between radio waves propagating through space and electric currents moving through metal conductors. In transmission, a radio transmitter may send an electric current to an antenna's terminal, and in response, the antenna may radiate energy from the current as electromagnetic waves. In reception, an antenna may intercept some of the power of a radio wave to produce an electric current at its terminal. Antennas are essential components of radio equipment, and the term "radio," in some examples, may include multiple parts of an antenna feed structure including amplifiers, tuners, impedance matching circuits, transmitters, receivers, filters, or other electronic components used in the transmission or reception of wireless signals.

Returning to FIGS. 1A and 1B, antennas 130 and 132, respectively, may be connected to a processor in watch body 110 via a conductive feeding structure (e.g., a metal pin, a spring-loaded pin, etc.) or capacitive coupling, as discussed in greater detail in connection with FIGS. 4A and 4B.

Antennas may be integrated into textile bands in any suitable manner. In some examples, an antenna integrated into a textile band may include a conductive thread. The term conductive thread generally refers to any thread made from a material that allows electric current to flow through it. Examples of conductive materials from which conductive threads may be formed include copper, silver, graphite, graphene, gold, etc. In contrast, non-conductive threads generally refer to threads made from materials that do not allow electric current to flow through them, such as dielectric materials. Such non-conductive threads may be formed from plant-based materials, such as cotton, hemp, etc. Alternatively, non-conductive threads may be formed from synthetic fibers, such as polyester, nylon, polypropylene, etc. Non-conductive threads may also be formed from any other suitable materials.

The term textile band generally refers to any type or form of band for a wearable device. Textile bands may include watch bands, headset bands, ankle bands, chest bands, etc. Textile bands may be formed from any fabrication technique, including weaving, knitting, and/or embroidering. Textile bands may also be made from any suitable type or form of material, including plant-based threads, animal-based thread, cellulosic threads, semi-synthetic threads, and synthetic threads, as discussed in greater detail below. Textile bands may be formed to secure wearable devices (e.g., headsets, watches, etc.) to users by buckling, snapping, stretching, or otherwise conforming to and attaching around a body part of a user.

In some embodiments, conductive threads may be formed from conductive strands, where the strands of the threads are made from metals or other conductive materials. In other embodiments, a conductive thread may include a thread having a non-conductive core coated with a conductive material. In some examples, a non-conductive core may be formed from non-conductive threads. Alternatively, a non-conductive core may be formed from other synthetic materials (e.g., silicon) or non-synthetic materials (e.g., leather). The conductive coating may be any suitable conductive material, such as copper, silver, graphite, graphene, gold, etc.

In some examples, a conductive thread may include a conductive core within a nonconductive material. As one example, a band may include non-conductive textile threads interwoven with antenna threads that have liquid metal cores. To form such antenna threads, liquid metal may be injected into tubes made from any suitable material, including silicone, rubber, nylon, etc. Any number of threads, including a single thread up to all threads of a textile band, may include liquid metal and may be part of a liquid metal antenna.

Any suitable gallium alloy may be used to form a liquid metal antenna. In some embodiments, an antenna may be formed from gallium-indium (e.g., 75% gallium and 25% indium with a melting point of 15.7° C.). As another example, a liquid metal antenna may be formed from Galinstan (e.g., 68% gallium, 22% indium, and 10% tin with a melting point of around 11° C.). A liquid metal antenna may also be formed from any other gallium alloy, any other composition of the alloys discussed herein, and/or any other suitable liquid metal. In some examples, a liquid metal antenna may include at least 60% gallium, at least 65% gallium, at least 70% gallium, at least 75% gallium, at least 80% gallium, at least 85% gallium, etc. In certain embodiments, a liquid metal antenna may be made from a eutectic alloy (e.g., a eutectic gallium indium alloy) whose composition corresponds to the minimum melting temperature of the different possible compositions of materials in the alloy.

Liquid metals based on gallium may have various attributes that are beneficial for use as antennas. For example, the melting points of gallium and its alloys are near or below room temperature. Also, gallium and its alloys can remain in the liquid phase well below the melting point (i.e., gallium supercools). Furthermore, gallium has a negligible vapor pressure at room temperature and relatively low cytotoxicity, which makes it compatible for used in wearable devices. Gallium and its alloys may possess water-like viscosity that enables it to deform as a band deforms, and compared to other room-temperature liquids (such as salt water or ionic liquids), the electrical conductivity of gallium and its alloys is relatively high and suitable for use as an antenna.

Gallium and its alloys, in addition to being soft, reconfigurable, and conductive, may also have self-healing properties. For example, gallium and gallium alloys, when exposed to oxygen, may form a native oxide skin that lowers the interfacial energy of the liquid metal while adding a mechanical skin. This may give gallium and gallium oxide the ability to heal from small punctures or other damage. This oxide layer may also help stabilize the shape of a gallium or gallium oxide antenna, and the gallium or gallium oxide may still be adaptable and flow readily when external pressure overcomes the yield stress of the oxide skin.

In some examples, the antennas described herein may be configured to conform to one or more features of the bands in which they are embedded. For example, antennas 130 and 132 may be woven, knitted, printed, or otherwise formed around one or more circular openings 140 of a watch band.

Various types and forms of antennas may be integrated into textile bands. As an example, FIG. 2A shows a cross-sectional top view of a device 200 having a band 205 and a body 240. Band 205 may include a non-conductive material 210 (e.g., a dielectric material) with an integrated patch antenna 220. Patch antenna 220 may be coupled, via a feeding transmission line 230, to electronics within a wearable body 240. Patch antenna 220 may be any suitable size, shape, or thickness. FIG. 2B, in addition to showing a cross-sectional side view of band 205, non-conductive material 210, patch antenna 220, transmission line 230, and body 240, also shows a ground plane 250 and a terminal 242 that couples ground plan 250 to electronics within body 240. FIG. 2B also shows a terminal 244 that couples transmission line 230 to electronics within body 240.

As another example, FIG. 3A shows a cross-sectional top view of a wearable device 300 having a band 305 coupled to a body 340. Band 305 may include a non-conductive material 310 with an integrated monopole antenna 320. Monopole antenna 320 may be coupled, via a feeding transmission line 330, to electronics within a wearable body 340. Monopole antenna 320 may be any suitable size, shape, or thickness. FIG. 3B, in addition to showing a cross-sectional side view of band 305, non-conductive material 310, patch antenna 320, transmission line 330, and body 340, also shows package grounding 350 and a terminal 342 that couples package grounding 350 to electronics within body 340. FIG. 3B also shows a terminal 344 that couples transmission line 330 to electronics within body 340.

Figure 4A:
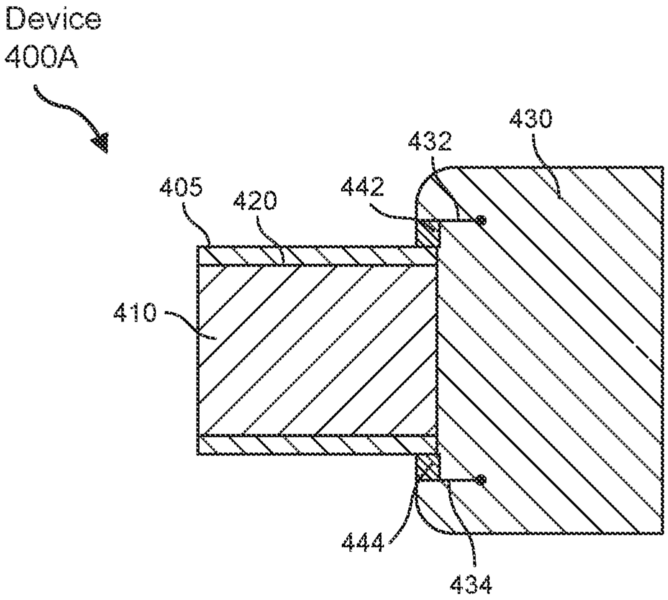
FIG. 4A is an illustration of contact pins for electrical coupling with an antenna within a textile strap.
Figure 4B:
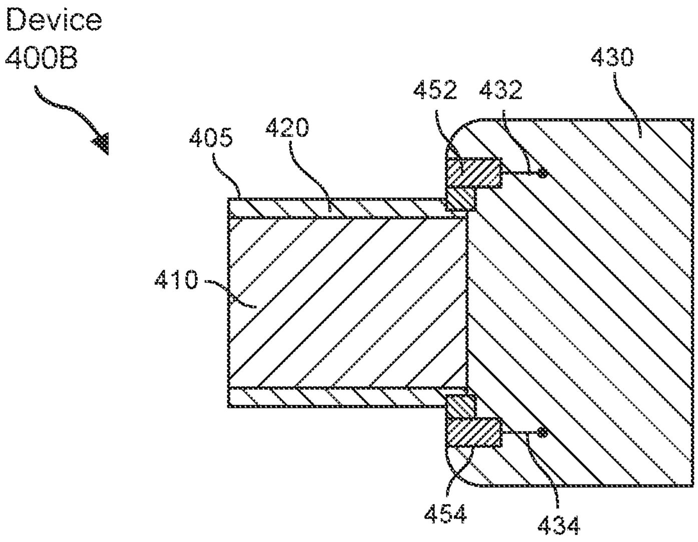
FIG. 4B is an illustration of a capacitive coupling mechanism for an antenna within a textile strap.

FIGS. 4A and 4B show different types of electrical couplings that may be used to connect antennas in textile bands to electronics within a body of a wearable device. As shown in FIGS. 4A and 4B, wearable devices 400A and 400B may include a band 405 coupled to a body 430. Band 405 may include a non-conductive textile 410 and an antenna 420. In the example shown in FIG. 4A, pins 442 and 444 may physically couple antenna 420 to terminals 432 and 434. Alternatively, as shown in FIG. 4B, capacitive pads 452 and 454 may capacitively couple terminals 432 and 434 to antenna 420.

The electrical and capacitive couplings shown in FIGS. 4A and 4B may also be referred to as couplers. The term coupler generally refers to any mechanism for creating an electrical or electro-magnetic coupling between electronic components, such as the pins, antennas, and transmission lines disclosed herein.

The bands and antennas presented herein may be formed or manufactured in a variety of ways. For example, FIG. 5 shows a method for integrating a textile band into an antenna. At step 510, the systems described herein may integrate an antenna into a textile band of a wearable device. An antenna may be integrated into a band of a wearable device in numerous ways. As noted above, a textile-based antenna may include an electrically conductive strand, such as a metallized yarn, for example. The antenna may have a knit or woven construction. A fabric band may include a first fabric region formed from an electrically insulative thread and a second fabric region defining a textile-based antenna formed from an electrically conductive thread.

The fabric bands disclosed herein may exhibit breathability while inhibiting excessive accumulation of perspiration when tightly worn. In certain embodiments, textile antennas and corresponding conductive traces may be integrated into fabric wristbands with undetectable transitions between textile electronic components and the band's base material.

A fabric band, including a fabric antenna and transmission lines, may include any suitable fabric structure, including knit or woven fabrics. For woven fabrics, a conductive thread of an antenna and/or a transmission line may be interwoven with non-conductive threads to form a band. A knit fabric may be formed by inter-looping conductive and non-conductive threads or inter-meshing conductive and non-conductive threads. This type of fabric may be compliant and flexible. Knit fabrics may be made by hand knitting or machine knitting. Knit fabrics include weft-knit fabrics and warp-knit fabrics. Weft knitting is a fabric knit in which the loops run back and forth, while warp knitting is a fabric knit in which the loops run up and down. Weft knit fabric may be produced entirely from a single string of yarn, whereas warp-knit fabrics are made from multiple strings of yarn and may therefore be more suitable knitting techniques for knitting conductive and non-conductive threads together.

Woven fabric may be made on a loom by interweaving two sets of one or more threads in different directions. The respective sets of threads are called warps (lengthwise grain) and wefts (crosswise grain). On a loom, warp threads run vertically and weft threads run horizontally. Woven fabric is typically less compliant than knit fabric and may be stretched slightly when pulled diagonally (on bias) between weft and warp directions. Example weave types include plain weave, twill weave, and satin weave, although further weave types are contemplated.

In a plain weave, the threads all run in a perpendicular weaving pattern that resembles a checkerboard pattern. In a twill weave, the threads run in a ribbed diagonal pattern. When weaving twill, the weft thread (the horizontal thread) is woven over one or more warp threads (the vertical thread(s) held taught on a loom) and then under one or more warp threads. A satin weave features a plurality of weft threads extending over one warp thread, or vice versa (plural warp threads extending over a weft thread).

The system described herein may also use a variety of other approaches to integrate an antenna into a textile band of a wearable device. In some embodiments, the systems described herein may form textile-based antennas by embroidering conductive threads onto a non-conductive substrate (e.g., felt, cordura, cotton, polyester, quartzel fabric, lycra, silk, etc.). Alternatively, an antenna may be formed on a textile band by depositing a conductive material on a non-conductive textile. A conductive material may be deposited on a non-conductive textile via screen printing, coating, or any other suitable deposition process.

Turning to step 520 in FIG. 5, the systems described herein may dimension a textile band in a manner that enables the textile band to secure the wearable device to a user. The systems described herein may dimension a textile band in a variety of ways. In some embodiments, the textile band may be dimensioned by weaving non-conductive threads of the textile band into a shape dimensioned to fit around a body part (e.g., a wrist) of a user. In other examples, a textile band may be dimensioned by forming (e.g., printing, injection molding, etc.) a substrate of silicon or any other suitable material into a shape dimensioned to be worn around a body part of a user.

In addition to integrating antennas into bands and dimensioning such bands for use with wearable devices, the systems described herein may couple the antennas to a physical processor in a manner that enables the antenna to communicate with the physical processor. As noted above, such couplings may be created via physical contact (e.g., a conductive lead) or capacitive coupling. The term conductive lead generally refers to any type or form of pin or other physical connection for electronic coupling.

FIG. 6 shows a method for using an antenna that is integrated into a band of a wearable device. As shown, at step 610, the systems described herein may send a communication from a physical processor of a wearable device to an antenna integrated into a textile band of the wearable device. The systems described herein may send such communications in any suitable manner. For example, a processor may send a communication to the antenna via a coupling (e.g., a contact pin or capacitive coupling). Once the communication is received, the antenna may radiate electromagnetic waves representing the communication.

In some examples, the systems described herein may receive, in response to the communication radiated from the antenna, a response to the communication. This response may be sent from the antenna to the physical processor, which may perform one or more actions in response to the communication.

The signals and communications sent and received by the antennas disclosed herein may use any suitable protocol on any suitable frequency band. In some embodiments, the systems described herein may transmit and/or receive wireless fidelity (WiFi™) signals via antennas integrated into textile bands. Additionally or alternatively, the systems described herein may transmit and/or receive cellular signals (wide-, ultrawide-, and multi-band long-term evolution (LTE), 5th generation (5G), etc.) and/or short-range wireless signals (e.g., Bluetooth™, near field communication (NFC), etc.) via antennas integrated into textile bands. Additionally or alternatively, the systems described herein may transmit and/or receive global positioning system (GPS) signals via antennas integrated into textile bands.

As discussed above, integrating antennas into textile bands of wearable devices may provide a variety of advantages over prior systems and methods. By integrating antennas into textile bands of watches, artificial reality device headsets, and other wearable devices, antenna designers may be able to create antennas with significantly more surface area that is available in or around a body of a wearable device. Furthermore, by positioning an antenna on a band, instead of within a body, of a device, the systems described herein may decrease the potential for antennas to cause electromagnetic interference. And textile-based antennas may also be breathable, flexible, and resilient, which may provide both comfort and longevity when used in a wristband of a wearable device.

Embodiments of the present disclosure may include or be implemented in—conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
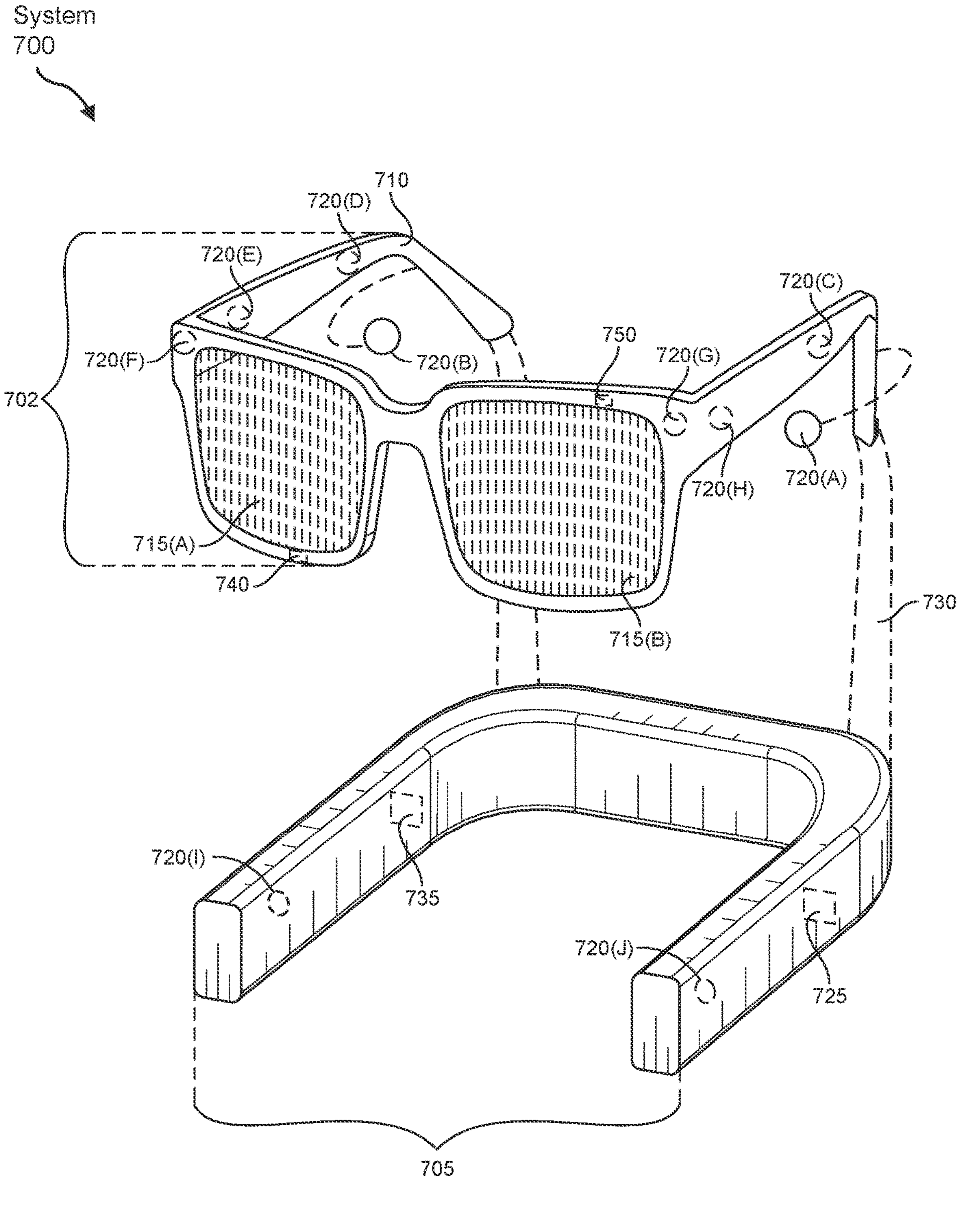
FIG. 7 is an illustration of exemplary augmented-reality glasses that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-720(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on frame 710, and/or acoustic transducers 720(I) and 720(J), which may be positioned on a corresponding neckband 705.

In some embodiments, one or more of acoustic transducers 720(A)-(J) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a BLUETOOTH connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720(D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source.

Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, microLED displays, organic LED (OLED) displays, digital light project (DLP) micro-displays, liquid crystal on silicon (LCOS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 700 and/or virtual-reality system 800 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 700 and 800 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 9:
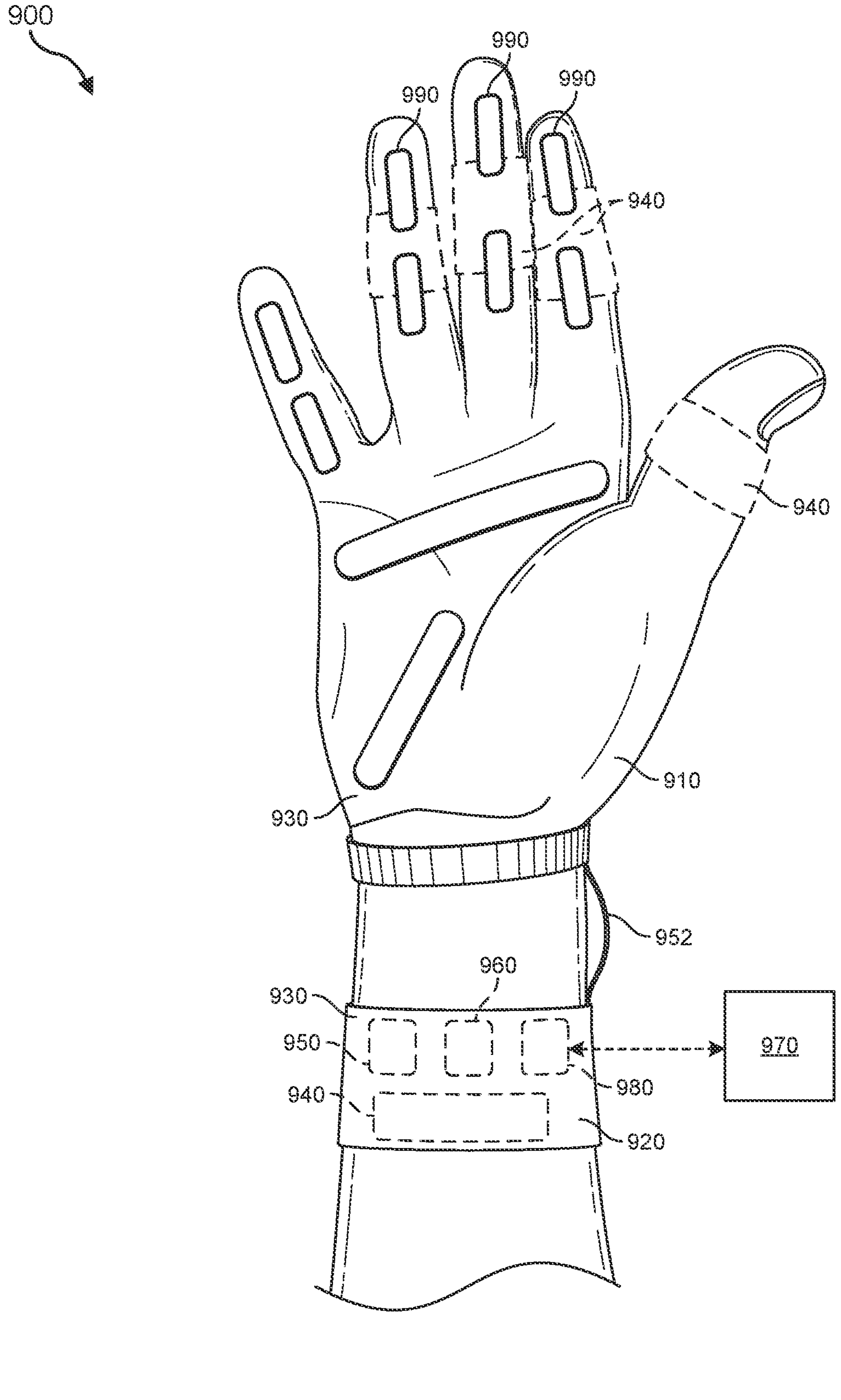
FIG. 9 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 9 illustrates a vibrotactile system 900 in the form of a wearable glove (haptic device 910) and wristband (haptic device 920). Haptic device 910 and haptic device 920 are shown as examples of wearable devices that include a flexible, wearable textile material 930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 940 may be positioned at least partially within one or more corresponding pockets formed in textile material 930 of vibrotactile system 900. Vibrotactile devices 940 may be positioned in locations to provide a vibrating sensation (e.g., haptic feedback) to a user of vibrotactile system 900. For example, vibrotactile devices 940 may be positioned against the user's finger(s), thumb, or wrist, as shown in FIG. 9. Vibrotactile devices 940 may, in some examples, be sufficiently flexible to conform to or bend with the user's corresponding body part(s).

A power source 950 (e.g., a battery) for applying a voltage to the vibrotactile devices 940 for activation thereof may be electrically coupled to vibrotactile devices 940, such as via conductive wiring 952. In some examples, each of vibrotactile devices 940 may be independently electrically coupled to power source 950 for individual activation. In some embodiments, a processor 960 may be operatively coupled to power source 950 and configured (e.g., programmed) to control activation of vibrotactile devices 940.

Vibrotactile system 900 may be implemented in a variety of ways. In some examples, vibrotactile system 900 may be a standalone system with integral subsystems and components for operation independent of other devices and systems. As another example, vibrotactile system 900 may be configured for interaction with another device or system 970. For example, vibrotactile system 900 may, in some examples, include a communications interface 980 for receiving and/or sending signals to the other device or system 970. The other device or system 970 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 980 may enable communications between vibrotactile system 900 and the other device or system 970 via a wireless (e.g., Wi-Fi, BLUETOOTH, cellular, radio, etc.) link or a wired link. If present, communications interface 980 may be in communication with processor 960, such as to provide a signal to processor 960 to activate or deactivate one or more of the vibrotactile devices 940.

Vibrotactile system 900 may optionally include other subsystems and components, such as touch-sensitive pads 990, pressure sensors, motion sensors, position sensors, lighting elements, and/or user interface elements (e.g., an on/off button, a vibration control element, etc.). During use, vibrotactile devices 940 may be configured to be activated for a variety of different reasons, such as in response to the user's interaction with user interface elements, a signal from the motion or position sensors, a signal from the touch-sensitive pads 990, a signal from the pressure sensors, a signal from the other device or system 970, etc.

Although power source 950, processor 960, and communications interface 980 are illustrated in FIG. 9 as being positioned in haptic device 920, the present disclosure is not so limited. For example, one or more of power source 950, processor 960, or communications interface 980 may be positioned within haptic device 910 or within another wearable textile.

Figure 10:
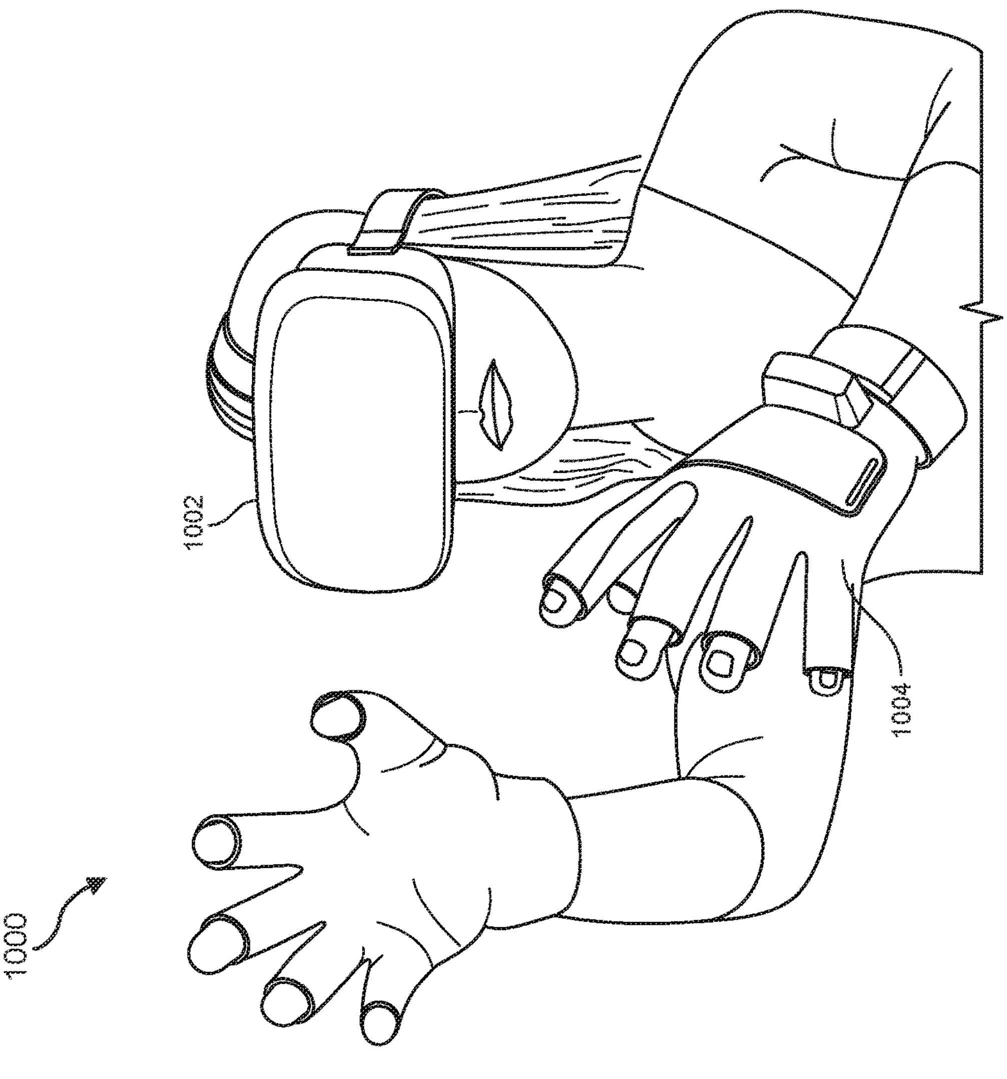
FIG. 10 is an illustration of an exemplary virtual-reality environment according to embodiments of this disclosure.

Haptic wearables, such as those shown in and described in connection with FIG. 9, may be implemented in a variety of types of artificial-reality systems and environments. FIG. 10 shows an example artificial-reality environment 1000 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 8:
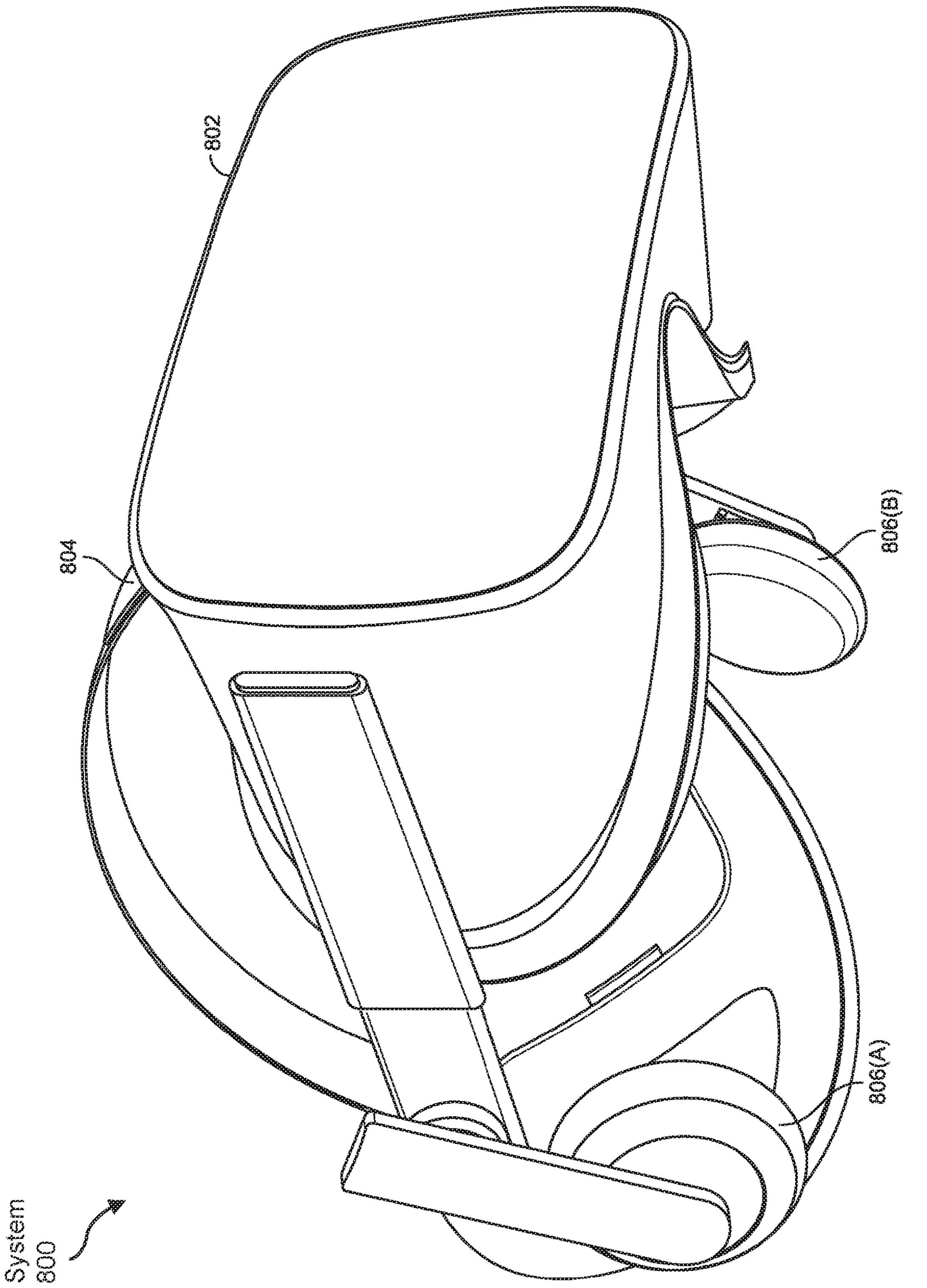
FIG. 8 is an illustration of an exemplary virtual-reality headset that may be used in connection with embodiments of this disclosure.

Head-mounted display 1002 generally represents any type or form of virtual-reality system, such as virtual-reality system 800 in FIG. 8. Haptic device 1004 generally represents any type or form of wearable device, worn by a user of an artificial-reality system, that provides haptic feedback to the user to give the user the perception that he or she is physically engaging with a virtual object. In some embodiments, haptic device 1004 may provide haptic feedback by applying vibration, motion, and/or force to the user. For example, haptic device 1004 may limit or augment a user's movement. To give a specific example, haptic device 1004 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1004 to send action requests to a console. Examples of action requests include, without limitation, requests to start an application and/or end the application and/or requests to perform a particular action within the application.

Figure 11:
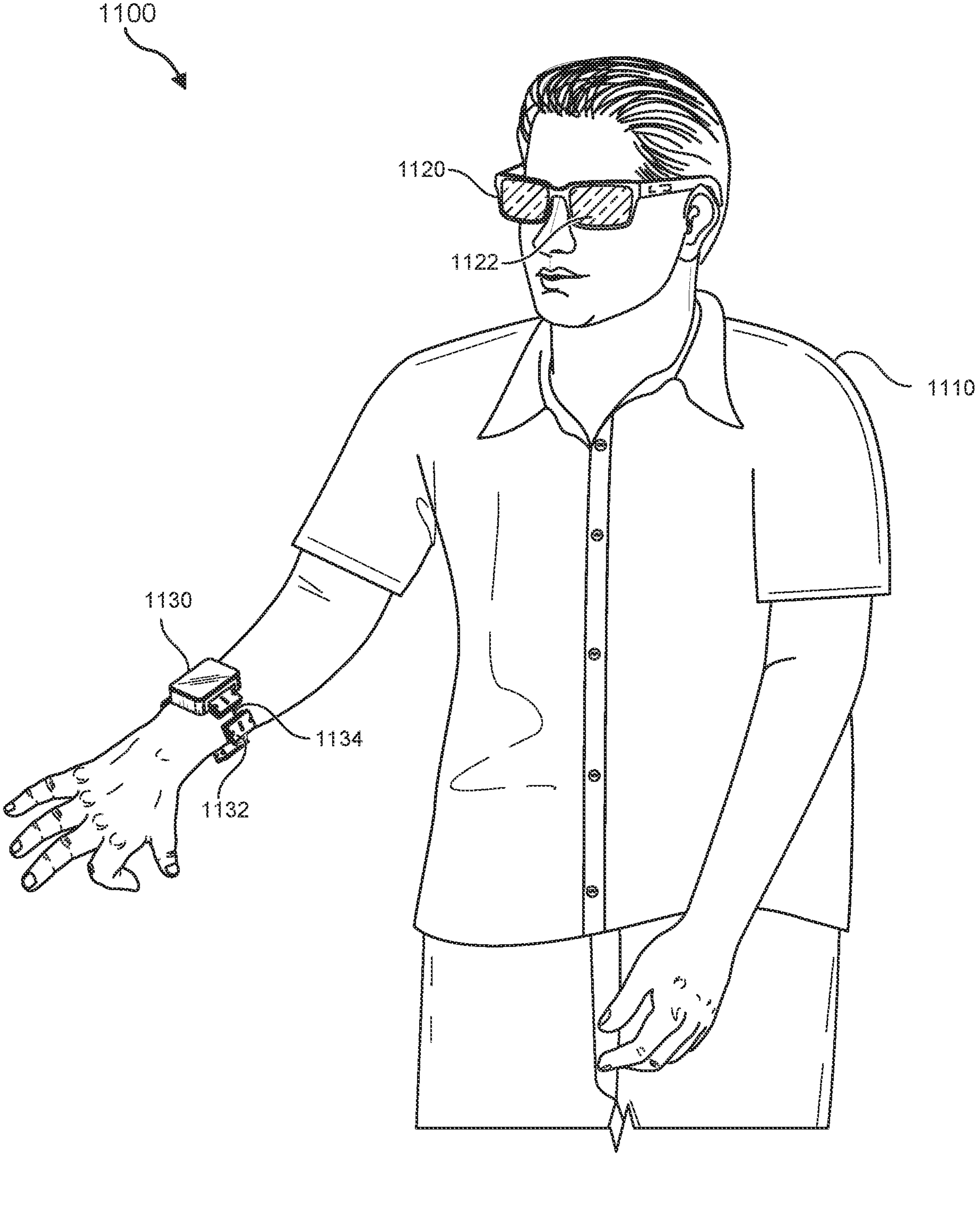
FIG. 11 is an illustration of an exemplary augmented-reality environment according to embodiments of this disclosure.

While haptic interfaces may be used with virtual-reality systems, as shown in FIG. 10, haptic interfaces may also be used with augmented-reality systems, as shown in FIG. 11. FIG. 11 is a perspective view of a user 1110 interacting with an augmented-reality system 1100. In this example, user 1110 may wear a pair of augmented-reality glasses 1120 that may have one or more displays 1122 and that are paired with a haptic device 1130. In this example, haptic device 1130 may be a wristband that includes a plurality of band elements 1132 and a tensioning mechanism 1134 that connects band elements 1132 to one another.

One or more of band elements 1132 may include any type or form of actuator suitable for providing haptic feedback. For example, one or more of band elements 1132 may be configured to provide one or more of various types of cutaneous feedback, including vibration, force, traction, texture, and/or temperature. To provide such feedback, band elements 1132 may include one or more of various types of actuators. In one example, each of band elements 1132 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 910, 920, 1004, and 1130 may include any suitable number and/or type of haptic transducer, sensor, and/or feedback mechanism. For example, haptic devices 910, 920, 1004, and 1130 may include one or more mechanical transducers, piezoelectric transducers, and/or fluidic transducers. Haptic devices 910, 920, 1004, and 1130 may also include various combinations of different types and forms of transducers that work together or independently to enhance a user's artificial-reality experience. In one example, each of band elements 1132 of haptic device 1130 may include a vibrotactor (e.g., a vibrotactile actuator) configured to vibrate in unison or independently to provide one or more of various types of haptic sensations to a user.

Figure 12A:
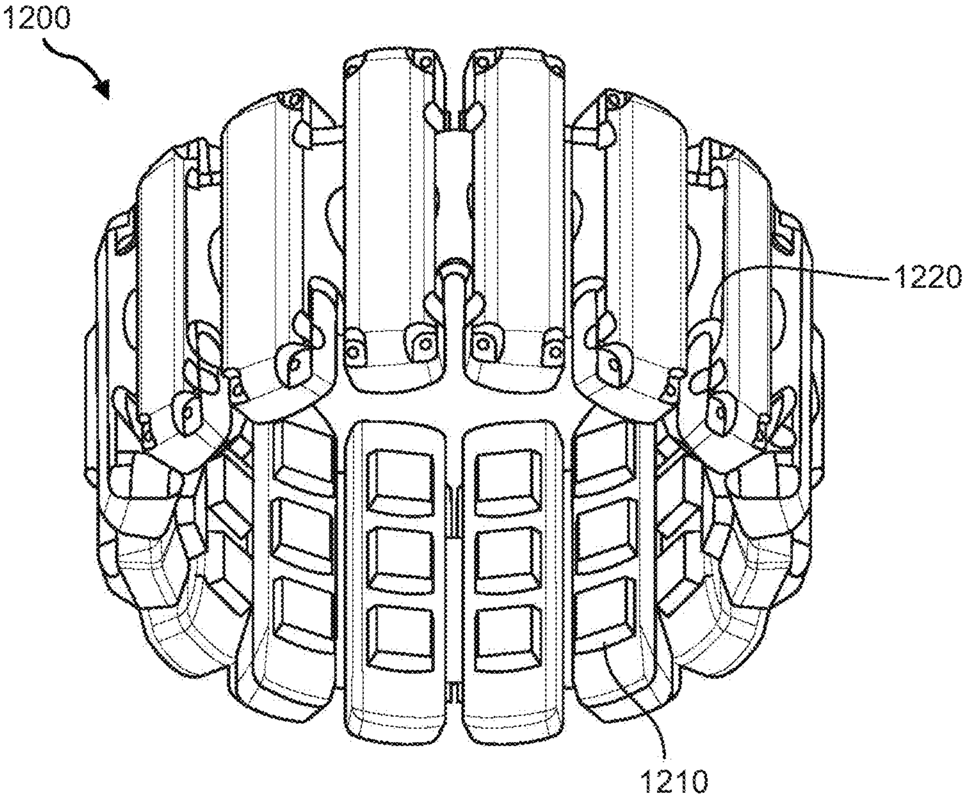
FIGS. 12A and 12B are illustrations of an exemplary human-machine interface configured to be worn around a user's lower arm or wrist.
Figure 12B:
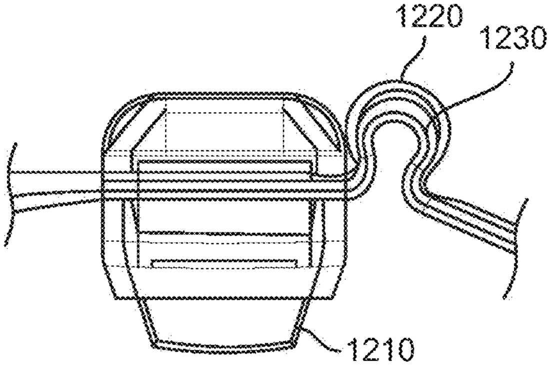

FIG. 12A illustrates an exemplary human-machine interface (also referred to herein as an EMG control interface) configured to be worn around a user's lower arm or wrist as a wearable system 1200. In this example, wearable system 1200 may include sixteen neuromuscular sensors 1210 (e.g., EMG sensors) arranged circumferentially around an elastic band 1220 with an interior surface 1230 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 12B illustrates a cross-sectional view through one of the sensors of the wearable device shown in FIG. 12A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1210 is discussed in more detail below with reference to FIGS. 13A and 13B.

Figure 13A:
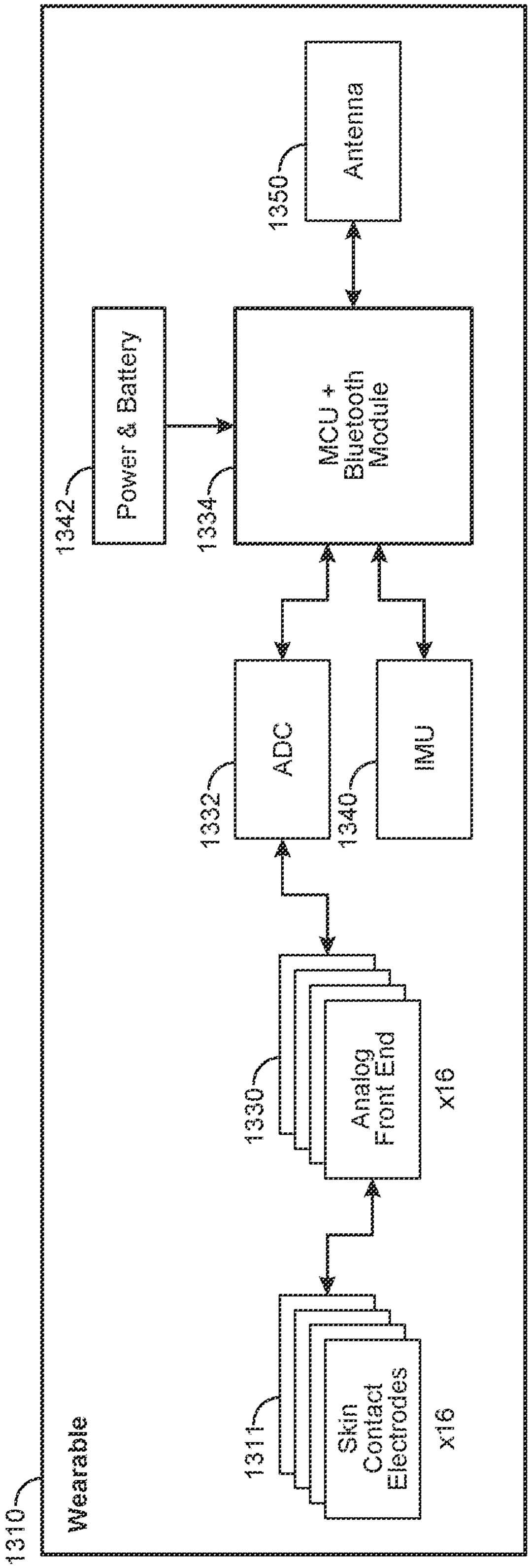
FIGS. 13A and 13B are illustrations of an exemplary schematic diagram with internal components of a wearable system.
Figure 13B:
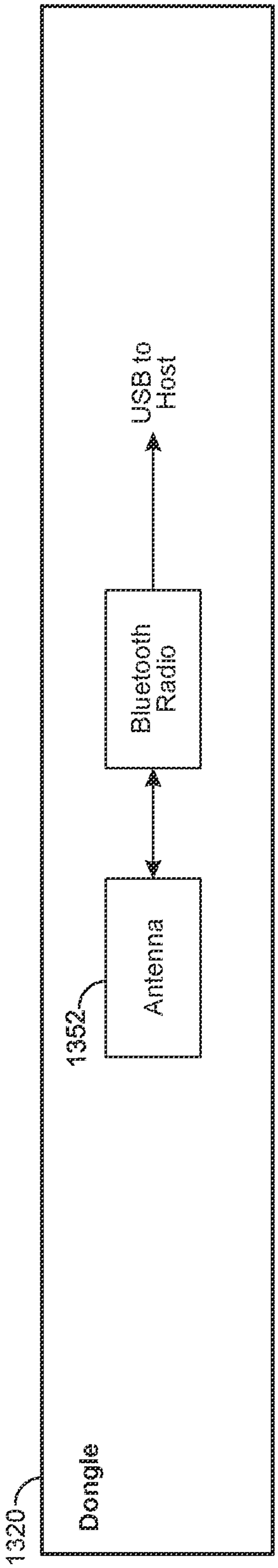

FIGS. 13A and 13B illustrate an exemplary schematic diagram with internal components of a wearable system with EMG sensors. As shown, the wearable system may include a wearable portion 1310 (FIG. 13A) and a dongle portion 1320 (FIG. 13B) in communication with the wearable portion 1310 (e.g., via BLUETOOTH or another suitable wireless communication technology). As shown in FIG. 13A, the wearable portion 1310 may include skin contact electrodes 1311, examples of which are described in connection with FIGS. 12A and 12B. The output of the skin contact electrodes 1311 may be provided to analog front end 1330, which may be configured to perform analog processing (e.g., amplification, noise reduction, filtering, etc.) on the recorded signals. The processed analog signals may then be provided to analog-to-digital converter 1332, which may convert the analog signals to digital signals that can be processed by one or more computer processors. An example of a computer processor that may be used in accordance with some embodiments is microcontroller (MCU) 1334, illustrated in FIG. 13A. As shown, MCU 1334 may also include inputs from other sensors (e.g., IMU sensor 1340), and power and battery module 1342. The output of the processing performed by MCU 1334 may be provided to antenna 1350 for transmission to dongle portion 1320 shown in FIG. 13B.

Dongle portion 1320 may include antenna 1352, which may be configured to communicate with antenna 1350 included as part of wearable portion 1310. Communication between antennas 1350 and 1352 may occur using any suitable wireless technology and protocol, non-limiting examples of which include radiofrequency signaling and BLUETOOTH. As shown, the signals received by antenna 1352 of dongle portion 1320 may be provided to a host computer for further processing, display, and/or for effecting control of a particular physical or virtual object or objects.

Although the examples provided with reference to FIGS. 12A-12B and FIGS. 13A-13B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

EXAMPLE EMBODIMENTS

Example 1: A wearable device comprising may include a physical processor and a textile band that is dimensioned to secure the wearable device to a user and that comprises an antenna. The wearable device may also include a coupler that communicatively couples the antenna to the physical processor.

Example 2: The wearable device of example 1, wherein the antenna comprises a conductive thread.

Example 3: The wearable device of any of examples 1 and 2, wherein the textile band comprises a non-conductive thread that is interwoven with the conductive thread.

Example 4: The wearable device of any of examples 1-3, wherein the textile band comprises a nonconductive thread knitted together with the conductive thread.

Example 5: The wearable device of any of examples 1-4, wherein the conductive thread is embroidered onto a non-conductive fabric.

Example 6: The wearable device of any of examples 1-5, wherein the conductive thread comprises conductive strands.

Example 7: The wearable device of any of examples 1-6, wherein the conductive thread comprises a nonconductive core coated with a conductive material.

Example 8: The wearable device of any of examples 1-7, wherein the conductive thread comprises a conductive core within a nonconductive material.

Example 9: The wearable device of any of examples 1-8, wherein the band comprises a nonconductive material and the antenna comprises a conductive material deposited on the nonconductive material.

Example 10: The wearable device of any of examples 1-9, wherein the coupler provides capacitive coupling with the antenna.

Example 11: The wearable device of any of examples 1-10, wherein the coupler physically contacts the antenna.

Example 12: A method may include integrating an antenna into a textile band of a wearable device and dimensioning the textile band in a manner that enables the textile band to secure the wearable device to a user.

Example 13: The method of example 12, further comprising coupling the antenna to a physical processor in a manner that enables the antenna to communicate with the physical processor.

Example 14: The method of any of examples 12 and 13, wherein coupling the antenna to the physical processor comprises providing, at a body of the wearable device, a conductive lead configured for communicative coupling with the antenna.

Example 15: The method of any of examples 12-14, wherein the antenna comprises a conductive thread and integrating the antenna into the textile band comprises at least one of: interweaving a conductive thread with a non-conductive thread or knitting a conductive thread together with a non-conductive thread.

Example 16: The method of any of examples 12-15, wherein the conductive thread comprises at least one of a conductive core within a nonconductive sheath, a conductive coating on a nonconductive core, or conductive threads.

Example 17: The method of any of examples 12-16, wherein integrating the antenna into the textile band comprises forming, within the textile band, at least one of a patch antenna or a monopole antenna.

Example 18: A method may include sending a communication from a physical processor of a wearable device to an antenna, wherein the antenna is integrated into a textile band of the wearable device and the textile band is dimensioned to secure the wearable device to a user. The method may also include radiating, from the antenna, electromagnetic waves comprising the communication.

Example 19: The method of example 18, further comprising receiving, at the antenna, electromagnetic waves comprising a response to the communication and sending the response to the communication from the antenna to the physical processor.

Example 20: The method of any of claims 18 and 19, wherein the electromagnetic waves comprise at least one of a WiFi signal, a cellular signal, or a Bluetooth signal.

In some examples, the term "processor" or "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A wearable device comprising:

a physical processor;

a textile band that:

is dimensioned to secure the wearable device to a user; and comprises an antenna, wherein the antenna extends from the physical processor into the textile band and extends along a length of the textile band; and a coupler that communicatively couples the antenna to the physical processor.

2. The wearable device of claim 1, wherein the antenna comprises a conductive thread.

3. The wearable device of claim 2, wherein the textile band comprises a non-conductive thread that is interwoven with the conductive thread.

4. The wearable device of claim 2, wherein the textile band comprises a nonconductive thread knitted together with the conductive thread.

5. The wearable device of claim 2, wherein the conductive thread is embroidered onto a nonconductive fabric.

6. The wearable device of claim 2, wherein the conductive thread comprises conductive strands.

7. The wearable device of claim 2, wherein the conductive thread comprises a nonconductive core coated with a conductive material.

8. The wearable device of claim 2, wherein the conductive thread comprises a conductive core within a nonconductive material.

9. The wearable device of claim 1, wherein:

the band comprises a nonconductive material; and the antenna comprises a conductive material deposited on the nonconductive material.

10. The wearable device of claim 1, wherein the coupler provides capacitive coupling with the antenna.

11. The wearable device of claim 1, wherein the coupler physically contacts the antenna.

12. A method comprising:

integrating an antenna into a textile band of a wearable device; and dimensioning the textile band in a manner that enables the textile band to secure the wearable device to a user.

13. The method of claim 12, further comprising coupling the antenna to a physical processor in a manner that enables the antenna to communicate with the physical processor.

14. The method of claim 13, wherein coupling the antenna to the physical processor comprises providing, at a body of the wearable device, a conductive lead configured for communicative coupling with the antenna.

15. The method of claim 12, wherein:

the antenna comprises a conductive thread; and integrating the antenna into the textile band comprises at least one of: interweaving a conductive thread with a nonconductive thread; or knitting a conductive thread together with a non-conductive thread.

16. The method of claim 15, wherein the conductive thread comprises at least one of:

a conductive core within a nonconductive sheath;

a conductive coating on a nonconductive core; or conductive threads.

17. The method of claim 12, wherein integrating the antenna into the textile band comprises forming, within the textile band, at least one of:

a patch antenna; or a monopole antenna.

18. A method comprising:

sending a communication from a physical processor of a wearable device to an antenna, wherein:

the antenna is integrated into a textile band of the wearable device; and the textile band is dimensioned to secure the wearable device to a user; and radiating, from the antenna, electromagnetic waves comprising the communication.

19. The method of claim 18, further comprising:

receiving, at the antenna, electromagnetic waves comprising a response to the communication; and sending the response to the communication from the antenna to the physical processor.

20. The method of claim 18, wherein the electromagnetic waves comprise at least one of:

a wireless fidelity signal;

a global positioning system signal; a cellular signal; or a short-range wireless signal.

* * * * *